(12) United States Patent
Rehmat et al.

(10) Patent No.: US 7,819,070 B2
(45) Date of Patent: Oct. 26, 2010

(54) METHOD AND APPARATUS FOR GENERATING COMBUSTIBLE SYNTHESIS GAS

(75) Inventors: Amirali G Rehmat, Darien, IL (US); Richard L Kao, Northbrook, IL (US); Jin Soo Chung, Hacienda Heights, CA (US)

(73) Assignee: JC Enviro Enterprises Corp., Hacienda Heights, CA (US)

( * ) Notice: Subject to any disclaimer, the term of this patent is extended or adjusted under 35 U.S.C. 154(b) by 140 days.

(21) Appl. No.: 11/160,940

(22) Filed: Jul. 15, 2005

(65) Prior Publication Data

US 2007/0012229 A1    Jan. 18, 2007

(51) Int. Cl.
*F23G 5/12* (2006.01)
(52) U.S. Cl. .................. 110/229; 110/315
(58) Field of Classification Search ............. 110/297, 110/308, 309, 314, 252, 251, 315, 316, 171, 110/229, 230, 231
See application file for complete search history.

(56) References Cited

U.S. PATENT DOCUMENTS

| | | | |
|---|---|---|---|
| 242,547 A * | 6/1881 | Iiegel | 110/229 |
| 2,715,881 A * | 8/1955 | O'Neil | 110/251 |
| 4,306,506 A | 12/1981 | Rotter | |
| 4,309,195 A * | 1/1982 | Rotter | 48/76 |
| 4,391,205 A * | 7/1983 | Morey | 110/224 |
| 4,452,611 A | 6/1984 | Richey | |
| 4,659,340 A | 4/1987 | Weaver | |
| 4,860,669 A * | 8/1989 | Collins et al. | 110/165 R |
| 5,157,176 A | 10/1992 | Munger | |
| 5,318,672 A * | 6/1994 | Losel | 201/10 |
| 5,958,360 A * | 9/1999 | Rehmat et al. | 423/573.1 |
| 6,048,374 A | 4/2000 | Green | |
| 6,615,748 B2 | 9/2003 | Sunter et al. | |
| 6,637,206 B2 | 10/2003 | Thiessen | |
| 6,647,903 B2 | 11/2003 | Ellis | |
| 2005/0095183 A1* | 5/2005 | Rehmat et al. | 422/188 |

\* cited by examiner

*Primary Examiner*—Kenneth B Rinehart
(74) *Attorney, Agent, or Firm*—JHK Law; Joseph H. Kim

(57) ABSTRACT

The present application discloses an apparatus for gasification of solid, liquid and gaseous organic feed materials having a fuel value into synthesis gas. The apparatus comprises: a gasification reactor vessel having a tapered interior with a minimum of four zones for introducing reaction gas mixtures, a central perforated diffuser pipe, a solid and liquid material inlet at the upper end of the uppermost zone, a solid and gas discharge outlet at the lower end of the bottom zone, wherein the reactor vessel defining a sequence of reaction zones from the material inlet to the material outlet including drying, pyrolysis, combustion and gasification zones, and confining downwardly moving the column of the feed materials within the zones, gas feed inlet pipes for introducing reaction gas into the zones, a synthesis gas discharge pipe below the zones, and a heat exchanger below the zones.

27 Claims, 4 Drawing Sheets

METHOD AND APPARATUS FOR GENERATING COMBUSTIBLE SYNTHESIS GAS

BACKGROUND OF THE INVENTION

1. Field of the Invention

The present invention relates generally to the field of waste to energy systems and more particularly conversion of organic containing solid, liquid and gaseous wastes into uniform and clean burning synthesis gas. The invention also relates to apparatus for the conversion of solid, liquid, and gaseous organic materials, having fuel value, by reactions with oxygen-bearing gases and water, into uniform gaseous fuel called synthesis gas.

2. General Background and State of the Art

The present invention is directed to a reactor vessel in which solid, liquid and gaseous organic wastes such as but not necessarily limited to forestry and agricultural residues, animal wastes, bacterial sludge, sewage sludge, municipal solid waste, food wastes, animal bovine parts, fungal material, industrial solid waste, waste tires, coal washing residue, petroleum coke, oil shale, even coal, peat and lignite, waste oil, industrial liquid wastes, residuals from petroleum refining and volatile organic compounds generated by the industrial processes are transformed into gaseous fuels with maximum conversion efficiency while maintaining resultant synthesis gas free of tar and oil. The organic materials of this type includes fixed carbon, volatile matter and ash.

Moisture is also included in the volatile matter. The objective of the transformation is to obtain essentially complete conversion of carbon and volatile matter into synthesis gas, while leaving only ash as solid residue. This transformation of the organic material takes place by combining these organic materials with steam and oxygen in a high temperature environment. Gas-solid contact, the temperature and the time allocated for gas-solid contact at a given temperature all play a role in the extent of conversion of the organic material introduced into the reactor vessel. Most of the time, the moisture content of the organic feed material is adequate for the transformation reactions. However, the present invention also includes the benefits of introducing additional moisture to produce uniform quality of the synthesis gas from this apparatus. The present invention does not preclude pre-drying of the organic feed material prior to its introduction into the reactor vessel.

The advantages of converting organic material into synthesis gas over directly combusting the organic material are quite significant. Direct combustion of organic materials mentioned above usually results in smoke and discharge of unwarranted polluting compounds to the detriment of human health. Besides, direct combustion results in deposition of tar in the chimneys which poses a fire hazard. In contrast, the synthesis gas, after production and clean-up, contains simple clean burning combustible gases, namely carbon monoxide, hydrogen and some methane along with non-combustible nitrogen, carbon dioxide and water vapor. This synthesis gas is drawn off to a secondary combustion chamber where heat energy is produced with no smoke, pollution, or tar formation. This synthesis gas is also suitable for fuel use for internal combustion engines.

The organic material transformation systems to produce synthesis gas belonging to the category of this invention falls into one of the three classifications, namely (1) updraft reactor, (2) downdraft reactor, and (3) crossdraft reactor. Under all of these categories, stack of solid organic material moves downwardly while reacting with oxygen-bearing gas and steam. In an updraft reactor, the direction of gas is flowing against the flow of solids, in a downdraft, the gas flows downward with the solids, and in crossdraft reactor, the gas flow traverses the descending column of solids. This invention is directed to an improved design for the downdraft reactor to avoid common pitfalls associated with that particular category of the reactor including tar formation, sintering of solid residue and incomplete conversion.

The downdraft system for converting solid organic material into gaseous fuel is not a new concept. This concept has been used for nearly a hundred years. Reed et al (1988) has succinctly summarized the application and operation of the downdraft gasifier.

In the last two decades or so, interest in biomass gasification has picked up as means of producing energy from renewable resources to supplement the foreign imports as well as to develop strategy for distributed generation for reasons of meeting energy security needs. This renewed interest has encouraged development of new and improved methods for making biomass gasification efficient and fuel gas generated from these cleaner in terms of its tar content. Conventionally, the primary focus of the development has been confined to processing relatively dry solid organic materials in the improved apparatus. The prior art has very little mention about ability to transform solid organic material containing moisture in excess of 20% when fed directly to the reactor vessel or the gasifier. The prior art also lacks any mention of simultaneous transformation of organic solid, liquid and gaseous material.

U.S. Pat. No. 4,306,506 teaches a method for high temperature gasification through injecting air in the oxidation zone prior to the downward moving solids passing through the reduction zone in order to reduce the level of tar in the fuel gas generated in the downdraft gasifier. This patent also teaches a method for the construction of the gasifier vessel comprising inner and outer shells to accommodate vessel expansion when subjected to high temperature.

U.S. Pat. No. 4,309,195 discloses gasifier configuration similar to one taught by U.S. Pat. No. 4,306,506 with an added feature of withdrawing moisture from the upper region of the downward draft gasifier and reinserting the same moisture into the oxidation zone.

U.S. Pat. No. 4,452,611 recognizes the need for turbulence during the solid-gas reaction to avoid sintering of material. This patent teaches method and benefit of multiplicity of jets installed within the downward draft gasifier, albeit, all of the jets are located in one plane more or less like a gas distributor in a fluidized bed. In this method, multiple solid discharges are provided.

U.S. Pat. No. 4,659,340 is an example of crossdraft gasifier that operates at pressures greater than atmospheric pressure. This patent also teaches a method of integrating grate clearing blade within the gasifier for the removal of sinters and clinkers.

U.S. Pat. No. 5,157,176 is an example of updraft gasifier which is used for pyrolysis and gasification of chopped rubber tires.

U.S. Pat. No. 6,048,374 is an example of indirectly heated downward draft gasifier which is propelled by the hot flue gas generated from combustion of residual char resulting from extraction of volatile component from solid organic material which is subjected to contact with hot flue gas.

U.S. Pat. No. 6,615,748 discloses a method of combusting a portion of the organic solid material to supply heat to propel pyrolysis and gasification of the balance of the solid material.

U.S. Pat. No. 6,637,206 discloses a method by which the exhaust gas from the combustor is reacted with solid organic material in a downdraft gasifier in the presence of oxygen and water to produce cleanburning fuel to power an engine.

U.S. Pat. No. 6,647,903 teaches the advantages of a stratified downdraft gasifier in which the oxygen-bearing gas is injected at different levels into the downward moving solids to create several zones for gas-solid interaction. This technique reduced the amount of tar in the fuel gas as well as reduced the incidence of sintering of the ash residual inside the gasifier.

SUMMARY OF THE INVENTION

The present invention relates to an apparatus for waste to energy conversion in which solid, liquid and gaseous organic materials having a fuel value are converted in a downdraft gasification reactor system to produce uniform and clean burning gaseous fuel commonly termed as synthesis gas. Accordingly, in one aspect, the present invention is directed to providing gasifier apparatus for admitting and reacting organic materials into a reactor vessel and to react these materials with oxygen-bearing gas streams to cause high temperature gasification reactions along the reactor vessel to maximize the conversion of these materials into synthesis gas.

Another embodiment of the invention includes a means of creating distinct zones within the reactor vessel to separate various steps entailed in the transformation of organic material into synthesis gas. These steps include material drying, pyrolysis, combustion and gasification.

Yet another embodiment of the present invention includes providing means of controlling temperature within each zone in the reactor vessel.

Still another embodiment of the present invention includes providing means of admitting oxygen of different concentrations in oxygen-bearing gas admitted to the reactor vessel.

Still another embodiment of the present invention includes providing means of solids dispersion within the reactor vessel to avoid unwarranted solids agglomeration, to provide unfettered downward flow of solid material through the reactor vessel, and to provide maximum interaction between the gases and solids within the reactor vessel.

In one aspect of the invention, the various embodiments described above are present or are achieved in a reactor apparatus of an inverted funnel configuration separated into several distinct zones to correspond with steps involved in the transforming of organic materials into uniform clean burning synthesis gas with each zone having independent capability to admit oxygen-bearing gas to cause appropriate temperature and reaction within that specific zone with means of dispersing solid material into the reactor vessel to attain maximum conversion of organic material into synthesis gas. The solid and liquid organic materials are introduced into the reactor vessel through inverted funnel shaped inlet. The gaseous organic material is introduced into the reactor vessel through the means provided for introducing oxygen-bearing gases into the reactor vessel. The organic materials react with oxygen-bearing gases during their downward traverse through the reactor vessel progressively undergoing drying, pyrolysis, combustion and gasification. The solid residue and synthesis gas move downwardly through all the zones within the reactor vessel and then through a funnel shaped constricting hearth into an expanded chamber to separate solid residue and synthesis gas. Solid residue is cooled by indirect means and continuously removed from the reactor vessel. The synthesis gas leaves from the freeboard region of the expanded chamber and is subjected to further cleaning and cooling and is then pulled through a suction blower or other device creating pulling action on synthesis gas generated in the reactor vessel. A separate means of solids dispersion is provided within the reactor vessel which is used for admitting gas to dispense solids for maximum reaction as well as to modulate the reaction.

In one aspect, the present invention is directed to an apparatus for gasification of solid, liquid and gaseous organic feed materials having a fuel value into synthesis gas, the apparatus comprising: a gasification reactor vessel having a tapered interior with a minimum of four zones for introducing reaction gas mixtures, a central perforated diffuser pipe, a solid and liquid material inlet at the upper end of the uppermost zone, a solid and gas discharge outlet at the lower end of the bottom zone, said reactor vessel defining a sequence of reaction zones from the material inlet to the material outlet including drying, pyrolysis, combustion and gasification zones, and confining downwardly moving column of said feed materials within the said zones, gas feed inlet pipes for introducing reaction gas into the zones, a synthesis gas discharge pipe below the zones, and a heat exchanger below the zones. The solid and liquid wastes may be introduced by means of enclosed conveyor into the material inlet. And the transition piece between the solids and liquid conveyor may include an inverted funnel shaped connector.

Further, the gas feed for introducing reaction gas into the zones may include an oxygen-bearing stream and waste gas stream and a minimum of four distinct annuli communicating with atmosphere. The gas feed admitting reaction gas may be tangential to the surface of the reactor vessel. Further, the number of tangential openings communicating between the annulus and the reactor vessel may vary between 1 and 4. Even further, the opening for admitting oxygen-bearing gas into the respective zone may traverse across the zone in which it is heated.

The reaction gas may comprise a mixture of air, oxygen, nitrogen, water or steam, and carbon dioxide. And the concentration of oxygen may be zero in the reaction gas which may include a mixture of waste gas and oxygen-bearing gas.

The waste gas may be admitted through alternating zones within the reactor vessel. The inside of the reactor vessel may be tapered into inverted funnel shape having a minimum inclusive diversion angle of 30 degrees. The reaction zones and solid residue discharge may be separated by a porous grate.

Further, the diffuser pipe may be blocked off at its terminal end within the upper zone of the reactor vessel and in which means of gas discharge may be provided by gas nozzles along as well as the top of the diffuser pipe. In addition, there may be no gas nozzles beyond the bottom reaction zone of the said reactor vessel.

In another aspect of the invention, the synthesis gas discharge pipe may be in communication with the reactor vessel. The invention may also include a system of material feeding device into the materials inlet of the reactor vessel comprises an enclosed feed conveyor connected to an enclosed feed storage silo to effectively seal off the reactor vessel from atmosphere to continuously feed the downwardly moving materials within the reactor vessel through an inverted cone shaped transition nozzle. The inverted transition nozzle may include a minimum inclusive diversion angle of 30 degrees. Further, the heat exchanger may be air, water or oil.

These and other objects of the invention will be more fully understood from the following description of the invention, the referenced drawings attached hereto and the claims appended hereto.

BRIEF DESCRIPTION OF THE DRAWINGS

There are other features, aspects, and advantages of the present invention which will become better understood with reference to the following description, appended claims and accompanying drawings, where:

DETAILED DESCRIPTION OF THE INVENTION

Figure 1:
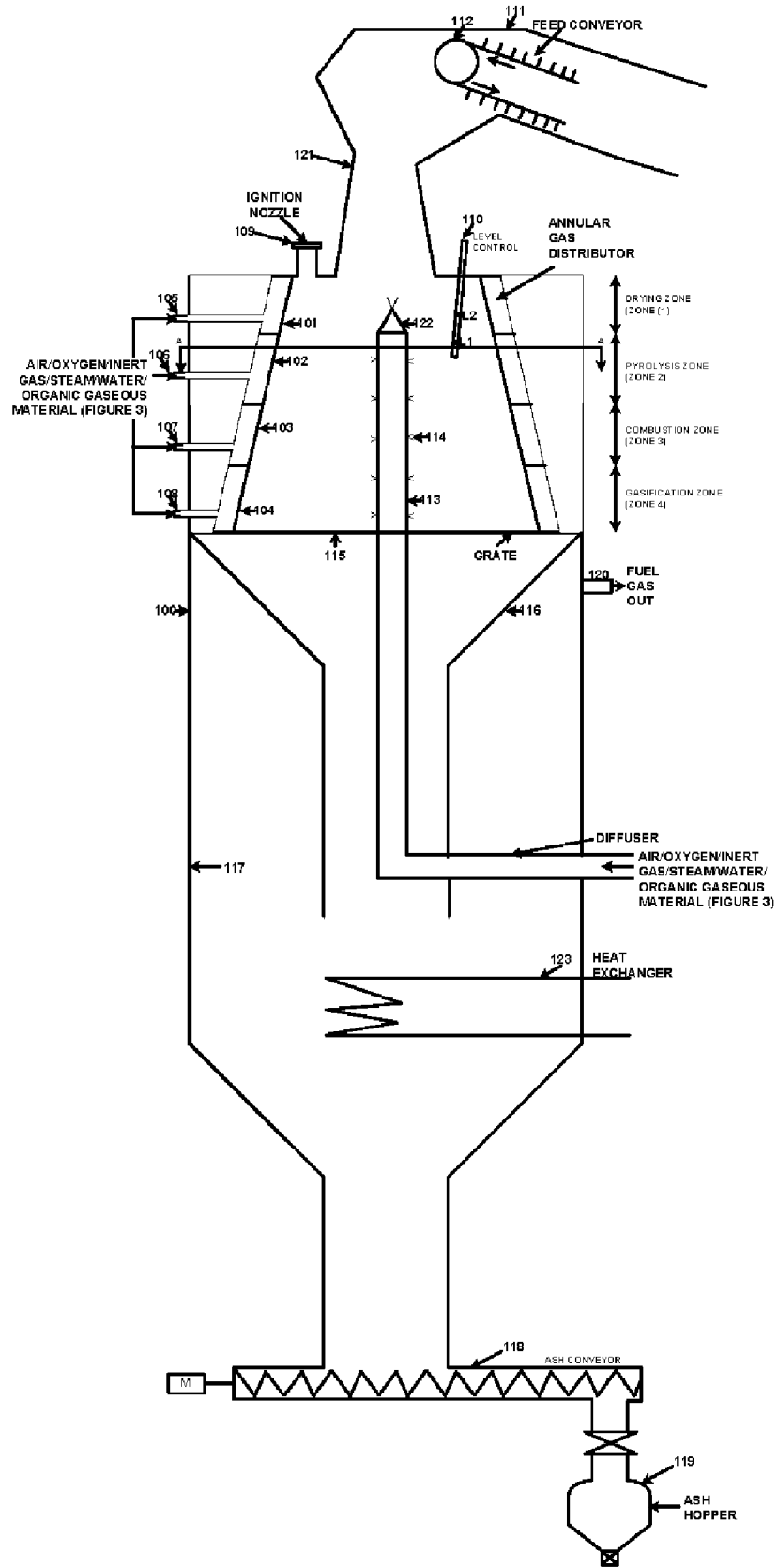
FIG. 1 shows a vertical sectional view of the reactor vessel in accordance with the present invention.

The present invention provides an apparatus and method for downward draft reactor vessel for conversion of solid, liquid and gaseous materials containing organic components into uniform and clean burning synthesis gas comprising primarily of carbon monoxide, hydrogen, carbon dioxide, nitrogen, water and methane. The invention operates in a manner that enhances the utilization of the feed material, minimizes incidence of temperature runaway conditions and avoids agglomeration of solid residues. The transformation of organic material takes place during its downward travel through several zones in the reactor vessel. Each zone is unique in terms of availability of oxygen for reaction with the material to form the resultant products and in terms of temperature. The zones occupy from top to the bottom of the reactor, and enable the feed material to encounter several physical and chemical transformations.

In the drying zone, the temperature is maintained between 600° F. to 900° F. to primarily drive off moisture from the solid feed material.

In the pyrolysis zone, the temperature is maintained between 900° F. to 1200° F. to primarily drive off heavy organic compounds from the solid feed material and retain carbon within the solid residue.

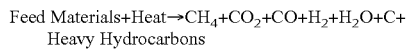
Heavy Hydrocarbons

In the combustion zone, the temperature is maintained between 1400° F. to 2400° F. for several reactions to take place simultaneously that consumes carbon in the solid residue, and breaks up heavy organic compounds into the desired components of the synthesis gas. The following reactions take place in the combustion zone:

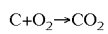

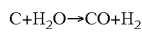

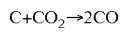

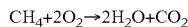

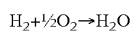

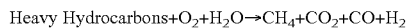

The net result achieved in combustion zone is conversion of organic compounds into simple gas components.

In gasification zone, the gases react primarily with water or steam to realign the composition according to the dictates of shift equilibrium which is dictated by the amount of steam introduced as well as the temperature maintained in the zone. The reactions that take place in the reduction zone include:

 (8)

 (9)

The net effect of the material passing through the reduction zone is attainment of uniformity of gas composition. Normally temperature in the reduction zone is maintained between 1600 to 1800° F.

In addition to converting solids, liquids and gaseous material containing organics into uniform synthesis gas, this invention provides an improved method for maximizing solids-gas contact for achieving maximum conversion as well as provide an improved method to disperse solid particles within the reactor vessel to avoid incidence of material agglomeration which has potential of choking the flow of solids through the reactor vessel. This is accomplished by increasing the diameter of the reactor vessel as the solids and gases move downward thereby continuously decreasing the flow of solids passing per unit area of the reactor vessel as well as by dispersing the solids by means of gases introduced through the diffuser pipe located inside the reactor vessel.

As used herein, the reactor vessel and conversion of organic material into synthesis gas refer to an apparatus and a method respectively that operate to convert solid, liquid and gaseous material containing organics into uniform and clean burning synthesis gas via the action of heat and oxygen-bearing gases on these materials. In contrast to prior art, which is applicable to solid material, the present invention is applicable to solid, liquid and gaseous materials. The liquid material containing heavy hydrocarbons and the product of pyrolysis of solid materials which are notorious in forming tars when subjected to heat. The inventive reaction method destroys tars so that when measured in the synthesis gas exiting the reactor vessel, the amount of tar present in the synthesis gas is less than 100 parts per million. In addition to drastic reduction in tar formation, the present invention also reduces problems resulting from solid residue agglomeration which is commonly caused in the presence of low turbulence and high temperature.

In accordance with the present invention, the solid feed material may comprise any solid organic material. Preferred solid materials include forestry and agricultural wastes, animal wastes, bacterial sludge, dried sewage sludge, municipal solid waste, food wastes, animal bovine parts, fungal material, industrial solid waste, waste tires, coal washing residue, petroleum coke, oil shale, and even coal, peat acid lignite. In accordance with the present invention, the liquid feed material may comprise any liquid organic material. Preferred liquid organic material includes waste oil, industrial liquid waste and residuals from petroleum refining. In accordance with the present invention, the gaseous organic material may comprise any gaseous organic material. Preferred gaseous organic material includes streams of gases containing volatile organic compounds generated by industrial processes. The materials entering the reactor vessel could contain water upto 90% by weight. However to mitigate the cooling effect of the water during the reaction and in order to sustain desired temperature within specific zones, waste fuels in appropriate proportions are added to the feed material. Preferred waste fuels include crushed waste tires, used oil, and petroleum coke.

In the following description, any oxidizing gas could be used that reacts with the feed material under reasonable operating conditions. Air is preferred because of its ready availability. However, the reactor system of the present invention could be utilized with other oxidizing gases, particularly gases having a higher oxygen content, or even substantially pure oxygen.

As used herein, the solid material throughput is defined by the downward moving velocity of the solid combined with initial cross section area of the reactor vessel combined with the bulk density of the solid material. The solids residence time is defined by the total volume of the reactor vessel bound by zones through which reaction gases are introduced and by the solid material throughput. Although the reactor vessel design of the present invention allow freedom with respect to quantity of oxygen-bearing gases as well as concentration of oxygen for each zone within the reactor vessel, the gas composition of the synthesis gas exiting the reactor vessel is dependent upon additive effect of all oxygen-bearing gases that are introduced into the reactor vessel due to equalizing influence of the shift reaction.

The reactor system of the present invention provides staged reactions between the organic material and oxygen-bearing gases while controlling the temperature of each stage and maintaining separation between the solid particles during reaction to avoid sintering and clinkering of the particles. Further, the oxygen-bearing gas is introduced through the tangential slots to confine the reactions taking place inside the reactor vessel away from the wall as well as to increase the time of reaction between the feed material and oxygen-bearing gases. Further, the solid particles within the reaction vessel are segregated by expanding the cross sectional area of the reactor vessel as the material moves downwards. Further, the segregation is aided by introducing reaching or non-reaching gases through the gas diffuser which is fitted with several gas nozzles pointed in various directions through which exiting gases contact the downward moving solids to cause random deflections. While the limitations on the use of inert gases is arbitrary, the overall amount of oxygen that can be introduced into the reactor vessel is limited by the balance between the rate of reaction of the organic feed material and the oxygen-bearing gas and by the temperature limits imposed within the reaction zone. The temperature limits are generally imposed due to material of construction limitation, for suppressing melting of solid residue, or for the conservation of oxygen.

One embodiment of the present invention is a staged reaction between the organic feed material and the oxygen-bearing gases. Accordingly, in the process organic material is introduced into the upstream end of the reactor vessel in a continuous manner that maintains the desired level of solid feed in the reactor vessel. The metered amount of oxygen-bearing gas is introduced along the length of the zone. The amount of oxygen-bearing gas entering each zone is controlled by a temperature controller set for the desired temperature within that particular zone.

In the first zone, drying zone, the oxygen-bearing gas is introduced to maintain temperature in the range of 600° F. to 900° F. If the moisture content in the organic feed stream is such that it hinders the ignition of organic material within the first zone, a burner operated with synthesis gas generated by the reactor vessel and oxygen-bearing gas can be used to improvise additional heat for the first zone of the reaction.

Additional oxygen-bearing gas is introduced into the second zone of the downward moving solids to increase the reaction temperature in the range of 900° F. to 1200° F. This is a pyrolysis zone in which much of the heavy organic compounds present in the solid material is released. The segregation of solids in this zone is particularly critical to avoid material coagulation. The solid residue passing through this zone contains only carbon and non-combustible ash.

The downward moving solid material, gases and heavy hydrocarbons then enter the third zone of the reactor vessel. In this zone, majority of the transformation reactions take place. This zone is termed combustion zone. Additional oxygen-bearing gas is introduced in order to raise the temperature of the zone in the range of 1400° F. to 2400° F. At these temperatures, majority of heavy hydrocarbons break down into simple gases while majority of the carbon in the solid residue react with oxygen, steam and/or carbon dioxide to form simple gaseous compounds. The transformation of heavy hydrocarbons to tar is avoided due to high temperature as well as sufficient turbulence to cause effective contact between oxygen and heavy hydrocarbons for reactions to proceed to completion. While completion of the reactions is a desired feature of the third zone, complete combustion is avoided. In other words, the reactions are carried out in substoichiometric conditions whereby oxygen supply to the zone is kept below the amount at which product of combustion are only carbon dioxide and water vapor. Under these prescribed conditions, the gases leaving the third zone consists primarily of a mixture of hydrogen, carbon monoxide, carbon dioxide, methane and water vapor while the solid residue comprises of primarily ash.

The mixture of gases and solid residue from the third zone enters the fourth zone where temperature is modulated between 1600° F. and 1800° F. by introducing water or steam. The fourth zone is intended to transform the gas mixture to a consistently uniform composition irrespective of the origin of the organic material fed to the reactor vessel. This is achieved by controlling the amount of water and/or steam introduced in the fourth zone and the temperature maintained in that zone. Another purpose of lowering temperature in the fourth zone is to prevent sintering of the solid residue while passing through the constricted outlet of the reactor vessel where the solid particles are no longer segregated. The composition of gas is normalized through the attainment of shift equilibrium which dictates the limitations on the simultaneous existence of carbon monoxide, hydrogen, water vapor and carbon dioxide at a given temperature.

Thus, in the manner described above, the organic material entering the reactor vessel of the present invention is completely transformed into uniform synthesis gas and solid residue consisting of ash. The gas as well as ash is passed through a narrow restriction at the bottom of the fourth zone into an expanded chamber where ash is cooled and withdrawn continuously while synthesis gas is withdrawn for further cleaning and for ultimate use.

Figure 2:
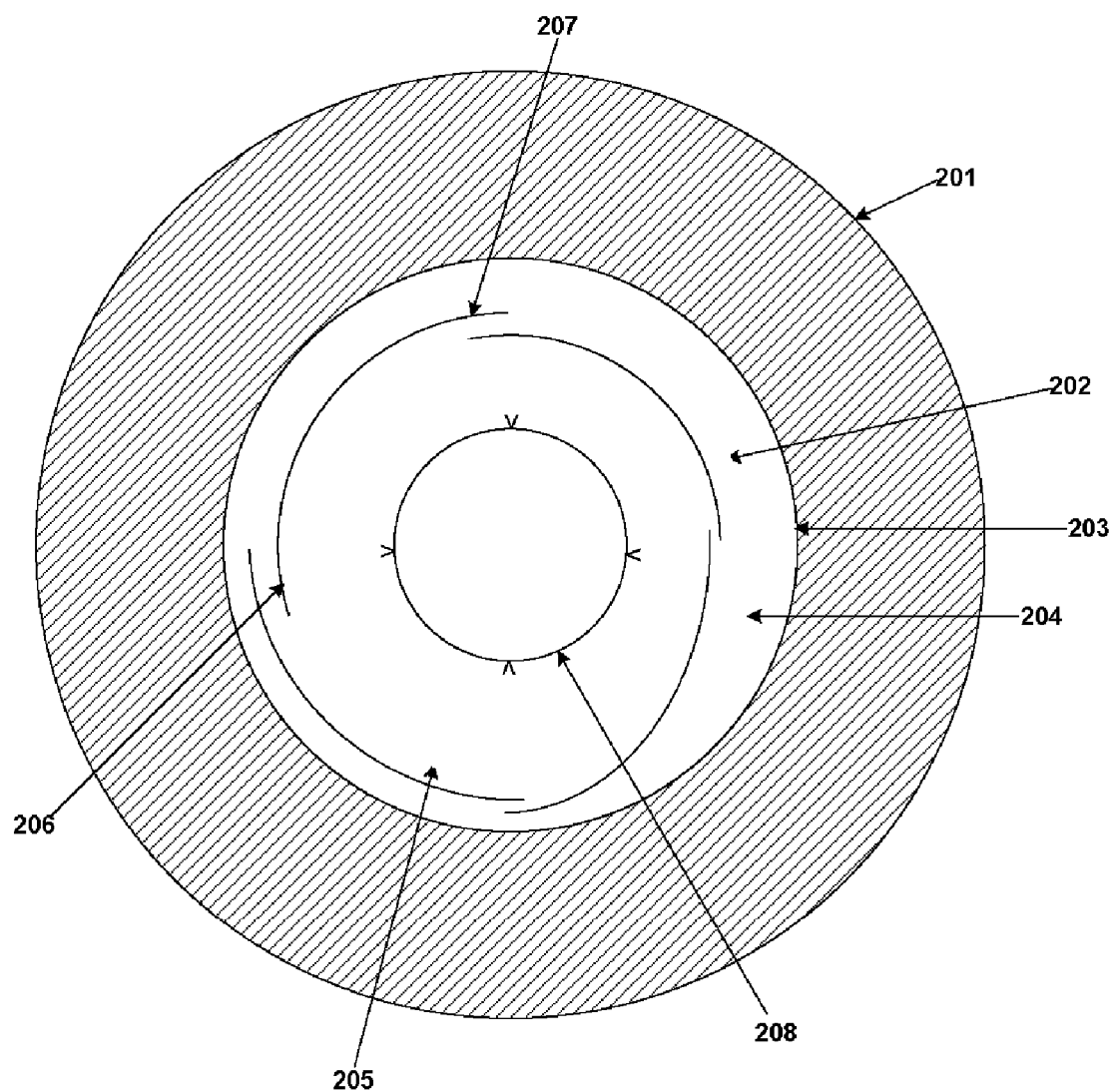
FIG. 2 shows a cross sectional view of the reactor vessel showing configuration of gas entry to the reactor vessel in accordance with the present invention.
Figure 3:
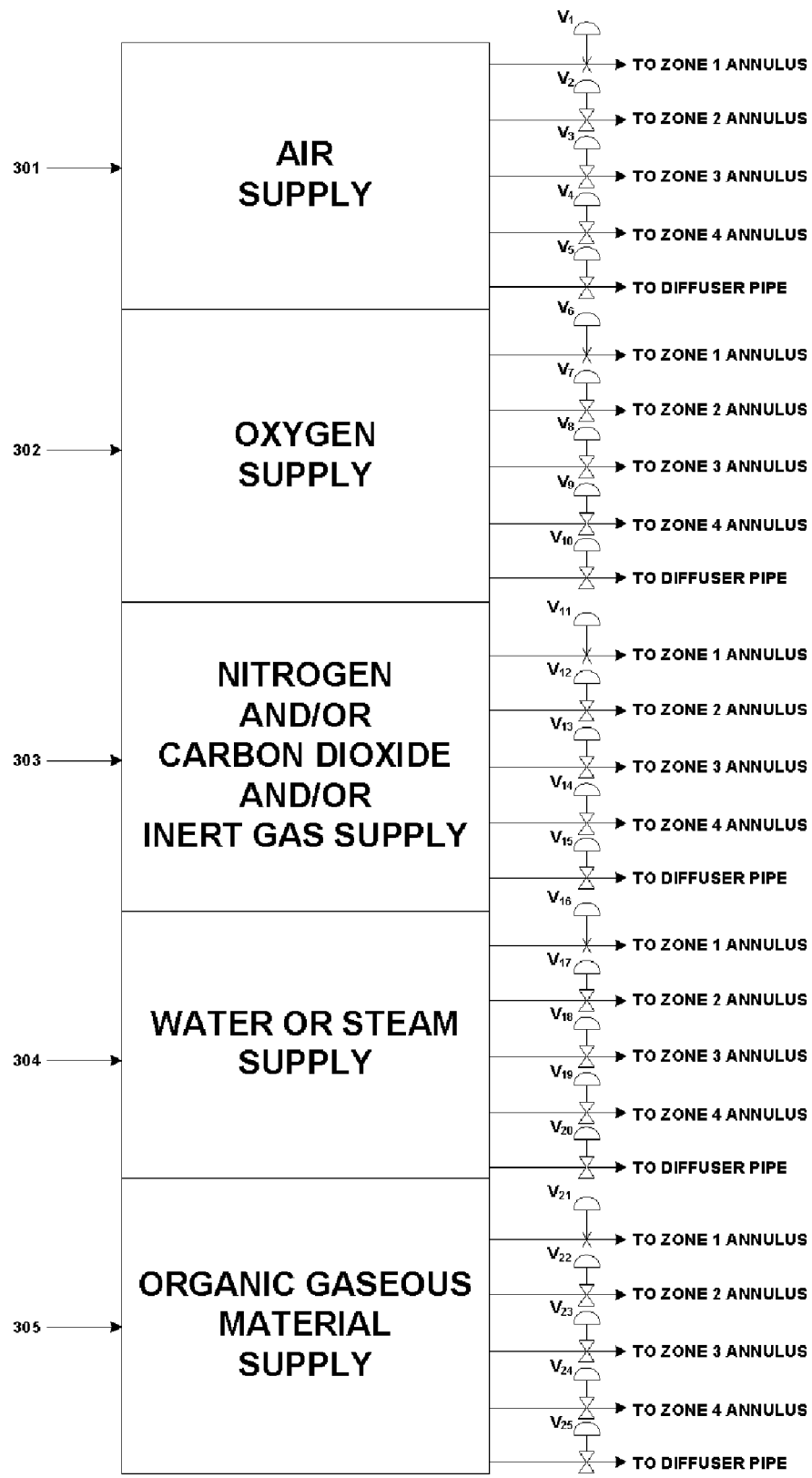
FIG. 3 shows a gas distribution chart showing details of oxygen-bearing gas supply, inert gas supply and organic gaseous material supply to the reactor vessel.

Referring to FIG. 1, one embodiment of the present invention is a reactor vessel 100 which is systematical about vertical axis. Reactor vessel 100 is of invested funnel shape so that the cross sectional area is continuously increasing in the downward direction of the solids and gas flow. The inside of the reactor vessel 100 is fitted with a gas distributor comprising of four or more sections: 101, 102, 103 and 104. Each section of the gas distributor 101, 102, 103 and 104 communicates with the interior of the reactor vessel through tangential openings 204, 205, 206 and 207 as referred in FIG. 2. Each gas distributor section 101, 102, 103 and 104 communicate with outside supply of air 301, oxygen 302, nitrogen, carbon dioxide or inert gas 303, water or steam 304 and organic gaseous material 305 referred in FIG. 3 through inlet pipes 105, 106, 107 and 108 as referred in FIG. 1. A solid and liquid feed inlet 121 at the top of reactor vessel 100 is of inverted funnel shape fed continuously by conveyor 112 enclosed in encasement 111. A person familiar with the art will recognize that this feed arrangement will take different shapes and configuration depending upon the organic feed material being fed to the reactor vessel. Similarly, the conveyor can be easily replaced by bucket elevator or screw feeder configuration without deviating from the spirit of the present invention. The ignition nozzle 109 houses the start-up burner for the reactor vessel and when warranted to provide supplementary heat to the first zone of the reactor vessel. The bed height in the reactor vessel is maintained by level control 110 which controls the movement of the feed conveyor. The control of the reactions taking place is managed by placing one or more temperature sensors within the zones 1 through 4 and this temperature information may be used to control the input of air and oxygen through valves $V_1$ to $V_5$ and $V_6$ to $V_{10}$ respectively. Similarly, gas composition sensor can be placed at the exit of the reactor vessel in the gas stream outlet pipe 120, and this gas composition information may be used to control the input of steam and/or water through valves $V_{16}$ to $V_{20}$.

The reactor vessel 100 is fitted with a diffuser pipe 113 located at its central axis. The diffuser pipe 113 is fitted with several nozzles 114 distributed over all reaction zones including the top of the closed end of the diffuser pipe 122. Normally inert gas will be introduced into the diffuser pipe through valves $V_{11}$ to $V_{15}$; however up to 10% of the overall oxygen requirement of the process may also be introduced into the reactor vessel through the diffuser pipe 113. In the preferred embodiment of the present invention, all the gaseous organic material is introduced into the reactor vessel through valves $V_{21}$ to $V_{25}$.

The products of reactions between the organic material and oxygen-bearing gases flow downwards through the gasifier vessel and exit the reaction zones through a perforated grate 115 attached to a funnel shaped constriction 116 communicating with expanded opening 117 where gas and solids are separated. Solids are cooled by indirect means of that heat exchanger 123 and conveyed to lock hopper system 119 through a screw conveyor 118 for ultimate disposal. The synthesis gas is withdrawn from the freeboard of the expanded opening 117 through a pipe 120. From this point onward, the synthesis gas is cooled, cleaned and utilized for heat and/or power.

Figure 4:
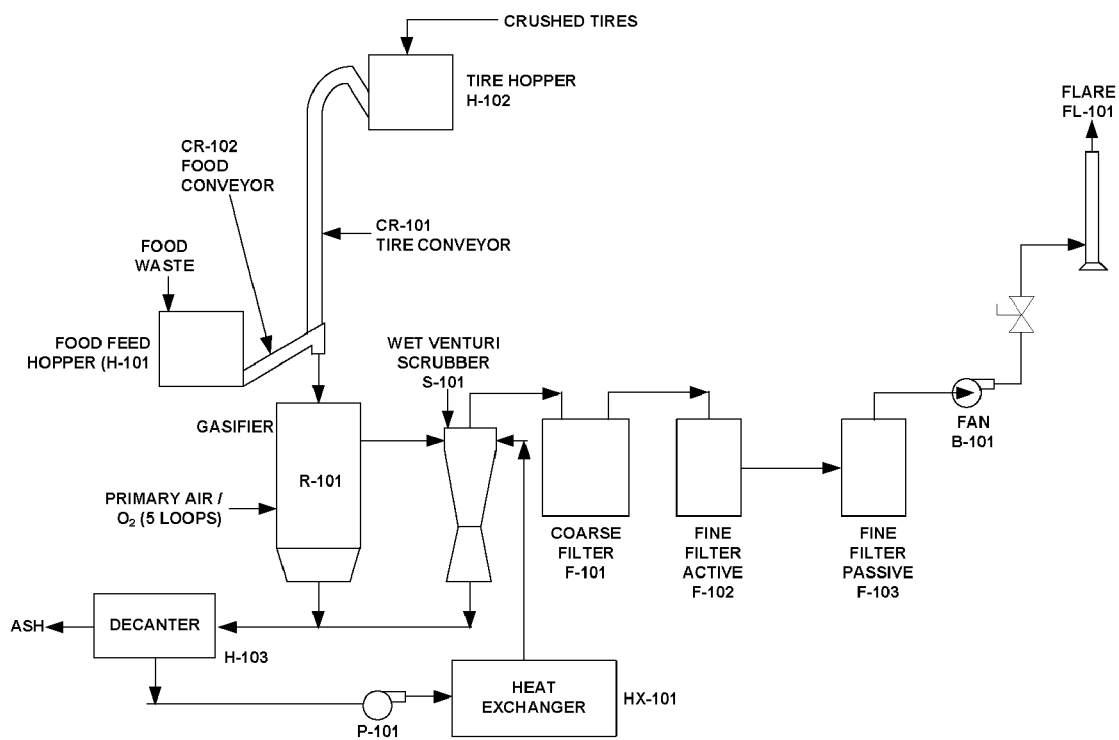
FIG. 4 shows a flow diagram of the gasifier in use.

FIG. 4 depicts an apparatus of the present invention utilized to produce clean synthesis gas from wastes. In this particular depiction, food wastes along with tires in predetermined ratio are fed to the gasifier R-101 via feed hoppers H-101 and H-102 and weigh belt conveyors CR-101 and CR-102. Oxygen-bearing gas are fed separately along the wall of the gasifier R-101 and through the diffuser pipe to maintain suitable temperatures in the range of 800° F. to 2000° F. along the downward path of the solids and gas flows to promote reactions between solid waste, water contained in the waste, and oxygen-bearing gases to convert organic components of the waste into synthesis gas containing CO, $H_2$, $CO_2$, $H_2O$, and $CH_4$. These gases along with some impurities present in the waste such as sulfur in the form of $H_2S$, heavy hydrocarbons which failed to break down in the gasifier R-101, evaporated salt that may have been present in the food waste, and some solid residues exit the gasifier R-101. Although this gas stream exits the gasifier R-101 at temperature in the range of 1400° F. to 1800° F. and contains recoverable sensible heat, it is prudent to forego this heat recovery in favor of unhindered operation. If the heat exchanger is introduced into the scheme to recover the sensible heat from the synthesis gas, the gas would undergo gradual cooling along the path of the heat exchanger and the heavy hydrocarbons and salt compounds present in the gas deposit on the heat exchanger and the gradual build up of these compounds result in a blockage in the heat exchanger sufficient enough to warrant a complete shut down of the system.

Instead, in the system as depicted in FIG. 4, the exiting gas is directly scrubbed with water using venturi scrubber S-101 where vigorous contact of the gas with water result in gas cooling to about 180° F. and disengagement of heavy hydrocarbons, salt compounds, and solid particulate residues. Solid ash from the gasifier R-101 as well as water from the scrubber S-101 are directed to decanter H-103 where solids and water are separated. Water after cooling in heat exchanger HX-101 is reused for the scrubber S-101.

The gas emanating from the venturi scrubber S-101 is further purified using series of filters F-101, F-102, and F-103. Each one of these serves a specific purpose. For example, the first filter may be a coarse filter made from renewable material such as wood chips to trap solid and heavy hydrocarbon particulates that may escape the scrubber S-101. The second filter may contain adsorbent material to remove sulfur compounds from the gas. One example of the adsorbent material that can be used is iron filings which have significant affinity to sulfur compounds. The third filter would be a fine filter in the form of fine fabric or paper to remove any residual solid particulate and heavy hydrocarbons that may have escaped the earlier filters. The function of the fan B-101 is to help transport gas through the gasifier R-101 and gas cleanup system by providing energy to overcome resistance within these processing units. The gas exiting the fan B-101 is purified and ready for use either as fuel gas or as building block for manufacturing liquid fuels or industrial chemicals. In this depiction the gas is simply flared in flare F-101.

The salient features of the present invention will become more evident from the examples which follow. The following examples illustrate the application to the downward draft reactor to some wastes. These examples shall not be regarded as restricting the scope of the invention, as they are only examples of employing the apparatus and method of the downward draft reactor according to the invention.

In the following examples, four different wastes with typical ultimate analysis as:

Food Wastes
Wood Wastes
Sewage Sludge
Used Tires are fed either singly or combined with other wastes into the downward draft reactor.

TABLE 1

TYPICAL ULTIMATE ANALYSIS OF FOOD WASTES, WOOD WASTES, SEWAGE SLUDGE, USED TIRES

| ELEMENTAL CONSTITUENT | WT % | | | |
|---|---|---|---|---|
| | FOOD WASTES | WOOD WASTES | SEWAGE SLUDGE | USED TIRES |
| C | 60.7 | 49.4 | 28.7 | 84.5 |
| H | 9.6 | 5.9 | 3.7 | 7.1 |
| O | 25.3 | 43.5 | 12.3 | 2.2 |
| N | 1.2 | 0.1 | 1.8 | 0.3 |

TABLE 1-continued

TYPICAL ULTIMATE ANALYSIS OF FOOD WASTES,
WOOD WASTES, SEWAGE SLUDGE, USED TIRES

| ELEMENTAL CONSTITUENT | WT % | | | |
|---|---|---|---|---|
| | FOOD WASTES | WOOD WASTES | SEWAGE SLUDGE | USED TIRES |
| S | 0.2 | 0.1 | 0.6 | 1.1 |
| Ash | 3.0 | 1.0 | 52.9 | 4.8 |
| TOTAL | 100.0 | 100.0 | 100.0 | 100.0 |
| Typical Moisture, wt % | 50.0 | 20.0 | 20.0 | 0.6 |
| Heating Value, Btu/lb, dry | 12,829 | 7,475 | 5,540 | 16,568 |
| Heat Value, Btu/lb, wet | 6,415 | 5,980 | 4,432 | 16,465 |

EXAMPLES

Example 1

2,000 lb/hr of food wastes with the analysis shown in Table 1 are fed into the downward draft reactor. The air flow rate is adjusted such that the reactor temperature is at 1800° F. In this example, 3,561 lb/hr of air flow is required.

The pressure in the reactor is kept slightly above atmospheric. 250 lb/moles/hr of synthesis gas are produced with the composition as follows:

TABLE 2

| PRODUCT GAS | MOLE % | |
|---|---|---|
| | WET | DRY |
| $H_2$ | 20.17 | 25.35 |
| CO | 12.46 | 15.66 |
| $CO_2$ | 7.83 | 9.84 |
| $N_2$ + Ar | 39.09 | 49.11 |
| $H_2S$ | 0.03 | 0.04 |
| $H_2O$ | 20.42 | — |
| TOTAL | 100.00 | 100.00 |
| Gross Heating Value, Btu/SCF | 105.79 | 132.94 |
| Synthesis gas Flow, lbmole/hr | 250 | 199 |

Example 2

Same as Example 1, except that an enriched air with 40 mole % of oxygen content is used. 1615 lb/hr of enriched air flow is required to maintain the reactor at 1800° F. 185 lbmoles/hr of synthesis gas are produced with the composition as follows:

TABLE 3

| PRODUCT GAS | MOLE % | |
|---|---|---|
| | WET | DRY |
| $H_2$ | 30.17 | 40.00 |
| CO | 18.17 | 24.09 |
| $CO_2$ | 9.19 | 12.18 |
| $N_2$ + Ar | 17.86 | 23.69 |
| $H_2S$ | 0.03 | 0.04 |
| $H_2O$ | 24.58 | — |
| TOTAL | 100.00 | 100.00 |
| Gross Heating Value, Btu/SCF | 156.64 | 207.70 |
| Synthesis gas Flow, lbmole/hr | 185 | 140 |

Example 3

Same as Example 1, except that an enriched air with 95 mole % of oxygen content is used. Only 663 lb/hr of enriched air flow is required to maintain the reactor at 1800° F. 153 lbmoles/hr of high quality synthesis gas are produced with the following composition:

TABLE 4

| PRODUCT GAS | MOLE % | |
|---|---|---|
| | WET | DRY |
| $H_2$ | 38.15 | 52.88 |
| CO | 22.69 | 31.45 |
| $CO_2$ | 10.29 | 14.26 |
| $N_2$ + Ar | 0.97 | 1.35 |
| $H_2S$ | 0.04 | 0.06 |
| $H_2O$ | 27.86 | — |
| TOTAL | 100.00 | 100.00 |
| Gross Heating Value, Btu/SCF | 197.17 | 273.32 |
| Synthesis gas Flow, lbmole/hr | 153 | 110 |

Example 4

In general, food wastes, wood wastes and sewage sludge have lower heating values than fossil fuels such as bituminous coal, oil or natural gas. It is beneficial to extend the range of compatible feedstocks such as used tires, waste oils, municipal solid wastes, etc. In this example, 500 lb/hr of used tires are used to replace part of the food wastes in Examples 1 to 3. The results are shown in Table 5.

TABLE 5

| Product Gas | Mole % | | | | | |
|---|---|---|---|---|---|---|
| | Air | | 40 Mole % $O_2$ | | 95 Mole % $O_2$ | |
| | Wet | Dry | Wet | Dry | Wet | Dry |
| $H_2$ | 20.49 | 22.94 | 32.15 | 36.52 | 42.36 | 48.71 |
| CO | 18.46 | 20.67 | 28.07 | 31.89 | 36.42 | 41.89 |
| $CO_2$ | 5.97 | 6.68 | 6.49 | 7.37 | 6.97 | 8.02 |
| $N_2$ + Ar | 44.32 | 49.62 | 21.21 | 24.10 | 1.06 | 1.22 |
| $H_2S$ | 0.08 | 0.09 | 0.11 | 0.12 | 0.14 | 0.16 |
| $H_2O$ | 10.68 | — | 11.97 | — | 13.05 | — |
| TOTAL | 100.00 | 100.00 | 100.00 | 100.00 | 100.00 | 100.00 |
| Gross Heating Value, Btu/SCF | 126.43 | 141.55 | 195.41 | 221.98 | 255.62 | 293.98 |
| Synthesis gas Flow, lbmole/hr | 300 | 268 | 212 | 187 | 169 | 147 |
| Oxidant Flow, lb/hr | 4855 | | 2207 | | 906 | |

Example 5

Same as Examples 1 to 3, except that sewage sludge is used to replace food wastes. The results are shown in Table 6.

TABLE 6

| Product Gas | Air Wet | Air Dry | 40 Mole % O$_2$ Wet | 40 Mole % O$_2$ Dry | 95 Mole % O$_2$ Wet | 95 Mole % O$_2$ Dry |
|---|---|---|---|---|---|---|
| H$_2$ | 20.78 | 23.75 | 31.39 | 36.64 | 40.17 | 47.70 |
| CO | 18.13 | 20.72 | 26.63 | 31.08 | 33.63 | 39.94 |
| CO$_2$ | 6.77 | 7.74 | 7.55 | 8.81 | 8.21 | 9.75 |
| N$_2$ + Ar | 41.63 | 47.58 | 19.85 | 23.17 | 1.88 | 2.23 |
| H$_2$S | 0.19 | 0.21 | 0.26 | 0.30 | 0.32 | 0.38 |
| H$_2$O | 12.50 | — | 14.32 | — | 15.79 | — |
| TOTAL | 100.00 | 100.00 | 100.00 | 100.00 | 100.00 | 100.00 |
| Gross Heating Value, Btu/SCF | 127.02 | 145.17 | 189.53 | 221.20 | 240.69 | 285.82 |
| Synthesis gas Flow, lbmole/hr | 154 | 135 | 112 | 96 | 91 | 77 |
| Oxidant Flow, lb/hr | 2,308 | | 1,049 | | 431 | |

Example 6

Same as Example 4, except that sewage sludge is used to replace food wastes. The results are shown in Table 7.

TABLE 7

| Product Gas | Air Wet | Air Dry | 40 Mole % O$_2$ Wet | 40 Mole % O$_2$ Dry | 95 Mole % O$_2$ Wet | 95 Mole % O$_2$ Dry |
|---|---|---|---|---|---|---|
| H$_2$ | 19.51 | 20.50 | 31.46 | 32.74 | 42.53 | 43.86 |
| CO | 24.27 | 25.49 | 37.80 | 39.34 | 50.24 | 51.82 |
| CO$_2$ | 3.71 | 3.90 | 2.92 | 3.04 | 2.23 | 2.30 |
| N$_2$ + Ar | 47.52 | 49.92 | 23.65 | 24.61 | 1.62 | 1.67 |
| H$_2$S | 0.18 | 0.19 | 0.26 | 0.27 | 0.34 | 0.35 |
| H$_2$O | 4.81 | — | 3.91 | — | 3.04 | — |
| TOTAL | 100.00 | 100.00 | 100.00 | 100.00 | 100.00 | 100.00 |
| Gross Heating Value, Btu/SCF | 142.56 | 149.77 | 225.40 | 234.57 | 301.87 | 311.33 |
| Synthesis gas Flow, lbmole/hr | 234 | 223 | 161 | 155 | 125 | 121 |
| Oxidant Flow, lb/hr | 4,041 | | 1,840 | | 75 | |

Example 7

Same as Examples 1 to 3, except that wood wastes are used to replace food wastes. The results are shown in Table 8.

TABLE 8

| Product Gas | Air Wet | Air Dry | 40 Mole % O$_2$ Wet | 40 Mole % O$_2$ Dry | 95 Mole % O$_2$ Wet | 95 Mole % O$_2$ Dry |
|---|---|---|---|---|---|---|
| H$_2$ | 36.20 | 38.40 | 42.11 | 44.57 | 45.64 | 48.23 |
| CO | 36.43 | 38.65 | 42.02 | 44.47 | 45.36 | 47.93 |
| CO$_2$ | 3.59 | 3.81 | 3.42 | 3.62 | 3.32 | 3.51 |
| N$_2$ + Ar | 18.01 | 19.11 | 6.91 | 7.31 | 0.27 | 0.29 |

TABLE 8-continued

| Product Gas | Air Wet | Air Dry | 40 Mole % O$_2$ Wet | 40 Mole % O$_2$ Dry | 95 Mole % O$_2$ Wet | 95 Mole % O$_2$ Dry |
|---|---|---|---|---|---|---|
| H$_2$S | 0.03 | 0.03 | 0.03 | 0.03 | 0.04 | 0.04 |
| H$_2$O | 5.74 | — | 5.51 | — | 5.37 | — |
| TOTAL | 100.00 | 100.00 | 100.00 | 100.00 | 100.00 | 100.00 |
| Gross Heating Value, Btu/SCF | 234.92 | 249.23 | 272.10 | 287.96 | 294.37 | 311.07 |
| Synthesis gas Flow, lbmole/hr | 164 | 155 | 145 | 137 | 135 | 128 |
| Oxidant Flow, lb/hr | 1,084 | | 493 | | 202 | |

Example 8

Same as Example 4, except that wood wastes are used to replace food wastes. The results are shown in Table 9.

TABLE 9

| Product Gas | Air Wet | Air Dry | 40 Mole % O$_2$ Wet | 40 Mole % O$_2$ Dry | 95 Mole % O$_2$ Wet | 95 Mole % O$_2$ Dry |
|---|---|---|---|---|---|---|
| CH$_4$ | 40.09 | 40.09 | 38.75 | 38.75 | 40.76 | 40.76 |
| H$_2$ | 0.00 | 0.00 | 1.61 | 1.61 | 0.00 | 0.00 |
| CO | 58.05 | 58.05 | 58.08 | 58.08 | 58.92 | 58.92 |
| CO$_2$ | 0.00 | 0.00 | 0.00 | 0.00 | 0.00 | 0.00 |
| N$_2$ + Ar | 1.59 | 1.59 | 1.28 | 1.28 | 0.12 | 0.12 |
| H$_2$S | 0.27 | 0.27 | 0.27 | 0.27 | 0.20 | 0.20 |
| H$_2$O | 0.00 | — | 0.00 | — | 0.00 | — |
| TOTAL | 100.00 | 100.00 | 100.00 | 100.00 | 100.00 | 100.00 |
| Gross Heating Value, Btu/SCF | 594.12 | 594.12 | 585.89 | 585.89 | 603.25 | 603.25 |
| Synthesis gas Flow, lbmole/hr | 87 | 87 | 88 | 88 | 86 | 86 |
| Oxidant Flow, lb/hr | 47 | | 52 | | 11 | |

Example 9

In Example 8, there is not enough moisture content in the food waste feed. Therefore, the product gas is water and carbon dioxide free, and the water-gas shift, steam-carbon and steam reforming reactions are all inhibited. Besides, a lot of methane is formed which increases the heating values dramatically.

In this Example, the 50 wt % moisture content wood wastes are used. The results are shown in Table 10.

TABLE 10

| Product Gas | Air Wet | Air Dry | 40 Mole % O$_2$ Wet | 40 Mole % O$_2$ Dry | 95 Mole % O$_2$ Wet | 95 Mole % O$_2$ Dry |
|---|---|---|---|---|---|---|
| CH$_4$ | 0.00 | 0.00 | 0.00 | 0.00 | 0.00 | 0.00 |
| H$_2$ | 20.95 | 23.81 | 31.08 | 36.02 | 39.29 | 46.25 |

TABLE 10-continued

| | Mole % | | | | | |
|---|---|---|---|---|---|---|
| | Air | | 40 Mole % O$_2$ | | 95 Mole % O$_2$ | |
| Product Gas | Wet | Dry | Wet | Dry | Wet | Dry |
| CO | 20.05 | 22.80 | 28.97 | 33.57 | 36.17 | 42.57 |
| CO$_2$ | 7.15 | 8.13 | 7.94 | 9.20 | 8.60 | 10.12 |
| N$_2$ + Ar | 39.73 | 45.16 | 18.18 | 21.07 | 0.75 | 0.88 |
| H$_2$S | 0.09 | 0.10 | 0.12 | 0.14 | 0.15 | 0.18 |
| H$_2$O | 12.03 | — | 13.71 | — | 15.04 | — |
| TOTAL | 100.00 | 100.00 | 100.00 | 100.00 | 100.00 | 100.00 |
| Gross Heating Value, Btu/SCF | 133.10 | 151.31 | 194.89 | 225.85 | 244.90 | 288.25 |
| Synthesis gas Flow, lbmole/hr | 247 | 217 | 182 | 157 | 150 | 127 |
| Oxidant Flow, lb/hr | 3,595 | | 1,634 | | 672 | |

Example 10

In some applications, it is preferable to have higher hydrogen content instead of carbon monoxide in the product gas. The product can be further combined with low pressure steam and go through a water-gas shift reactor to enhance the hydrogen content in the product gas. The proper amount of low pressure steam is added such that the carbon monoxide concentration in the final product gas is 0.15 mole %, wet.

TABLE 11

| | Mole % | | | | | |
|---|---|---|---|---|---|---|
| | Air | | 40 Mole % O$_2$ | | 95 Mole % O$_2$ | |
| Product Gas | Wet | Dry | Wet | Dry | Wet | Dry |
| CH$_4$ | 0.00 | 0.00 | 0.00 | 0.00 | 0.00 | 0.00 |
| H$_2$ | 29.12 | 37.83 | 35.93 | 51.98 | 39.48 | 62.21 |
| CO | 0.15 | 0.19 | 0.15 | 0.22 | 0.15 | 0.24 |
| CO$_2$ | 19.27 | 25.04 | 22.03 | 31.87 | 23.35 | 36.79 |
| N$_2$ + Ar | 28.36 | 36.85 | 10.94 | 15.83 | 0.40 | 0.63 |
| H$_2$S | 0.07 | 0.09 | 0.07 | 0.10 | 0.08 | 0.13 |
| H$_2$O | 23.03 | — | 30.88 | — | 36.54 | — |
| TOTAL | 100.00 | 100.00 | 100.00 | 100.00 | 100.00 | 100.00 |
| Gross Heating Value, Btu/SCF | 95.58 | 124.17 | 117.71 | 170.30 | 129.31 | 203.77 |
| Synthesis gas Flow, lbmole/hr | 346 | 266 | 203 | 209 | 286 | 182 |
| Oxidant Flow, lb/hr | 3,595 | | 1,634 | | 671 | |
| Steam Flow, lb/hr | 1,784 | | 2,176 | | 2,443 | |

Example 11

The synthesis gas produced after the water-gas shift reactor in Example 10 can be further cleaned up by a sour gas removal (CO$_2$ and H$_2$S) unit. Usually the water content in the product gas also goes along with the CO$_2$. The final clean and dry synthesis gas composition is shown in Table 12.

TABLE 12

| | Mole % | | |
|---|---|---|---|
| Product Gas | Air Dry | 40 Mole % O$_2$ Dry | 95 Mole % O$_2$ Dry |
| CH$_4$ | 0.00 | 0.00 | 0.00 |
| H$_2$ | 50.53 | 76.41 | 98.63 |
| CO | 0.26 | 0.32 | 0.37 |
| CO$_2$ | 0.00 | 0.00 | 0.00 |
| N$_2$ + Ar | 49.21 | 23.27 | 0.10 |
| H$_2$S | 0.00 | 0.00 | 0.00 |
| H$_2$O | 0.00 | 0.00 | 0.00 |
| TOTAL | 100.00 | 100.00 | 100.00 |
| Gross Heating Value, Btu/SCF | 165.07 | 249.38 | 321.76 |
| Synthesis gas Flow, lbmole/hr | 199 | 142 | 115 |

Since the CO acts as a severe polymer electrolyte membrane fuel cell electrocatalyst poison. For fuel cell applications, the final CO contaminant reduction from 0.26~0.37 mole % (Table 12) to less than 10 ppm can be optimally approached using a:

Catalytic Preferential Step:

$$CO + \tfrac{1}{2}O_2 \rightarrow CO_2 + H_2 \tag{10}$$

Methanation Step:

$$CO + 3H_2 \rightarrow CH_4 + H_2O \tag{11}$$

CO2-Selective Water-Gas Shift Membrane Reactor:

$$CO + H_2O \rightarrow CO_2 + H_2 \tag{9}$$

In such a membrane reactor, the CO$_2$ produced permeates through the membrane while CO and H$_2$ are rejected by the membrane. Thus the reverse water-gas shift reaction is prevented. Therefore in the membrane reactor, the conversion of CO is close to completion.

Example 12

In Example 3, the synthesis gas produced from food wastes and an enriched air with 95 mole % of oxygen content has a hydrogen to carbon monoxide molar ratio of 1.68 (Table 4). While in Example 5, the synthesis gas produced from sewage sludge has a hydrogen to carbon monoxide molar ratio of 1.19 (Table 6). In this Example, 479 lb/hr of steam is introduced into the fourth zone of the reactor vessel in Example 5, which transforms the hydrogen to carbon monoxide molar ratio from 1.19 to 1.68. This example shows that a consistently uniform composition of the synthesis gas can be produced from this invention irrespective of the origin of the organic material fed to the reactor vessel. The results are shown in Table 13.

TABLE 13

| | Mole % | | | | | |
|---|---|---|---|---|---|---|
| | Example 3 Food Wastes | | Example 5 Sewage Sludge | | Example 12 Sewage Sludge & Steam | |
| Product Gas | Wet | Dry | Wet | Dry | Wet | Dry |
| H$_2$ | 38.15 | 52.88 | 40.17 | 47.70 | 35.85 | 51.24 |
| CO | 22.69 | 31.45 | 33.63 | 39.94 | 21.32 | 30.47 |
| CO$_2$ | 10.29 | 14.26 | 8.21 | 9.75 | 11.09 | 15.85 |
| N$_2$ + Ar | 0.97 | 1.35 | 1.88 | 2.23 | 1.46 | 2.08 |

TABLE 13-continued

| | Mole % | | | | | |
|---|---|---|---|---|---|---|
| | Example 3 Food Wastes | | Example 5 Sewage Sludge | | Example 12 Sewage Sludge & Steam | |
| Product Gas | Wet | Dry | Wet | Dry | Wet | Dry |
| $H_2S$ | 0.04 | 0.06 | 0.32 | 0.38 | 0.25 | 0.36 |
| $H_2O$ | 27.86 | — | 15.79 | — | 30.03 | — |
| TOTAL | 100.00 | 100.00 | 100.00 | 100.00 | 100.00 | 100.00 |
| Gross Heating Value, Btu/SCF | 197.12 | 273.32 | 240.69 | 285.82 | 186.64 | 266.74 |
| Synthesis gas Flow, lbmole/hr | 153 | 110 | 91 | 77 | 118 | 83 |
| Oxidant Flow, lb/hr | 663 | | 431 | | 431 | |
| Steam Flow, lb/hr | 0 | | 0 | | 479 | |
| $H_2$/CO, Molar Ratio | 1.68 | | 1.19 | | 1.68 | |

While in the foregoing specifications, this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the this invention.

REFERENCES

Reed, Thoams B., et al, "Handbook of Biomass Downdraft Gasifier Engine Systems," SERI, A Division of Midwest Research Institute, Golden, Colo. (U.S. Dept. of Energy) (March 1988)

Barrco, M., et al "A Small-Scale Stratified Downdraft Gasifier Coupled to a Gas Engine for Combined Heat and Power Production," Norwegian University of Science & Technology, Dept. of Thermal Energy and Hydro Power, Throndheim, Norway (no date)

What is claimed is:

1. Apparatus for gasification of solid, liquid and gaseous organic feed materials having a fuel value into synthesis gas, the apparatus comprising:
   a gasification reactor vessel having a minimum of four reaction zones, said reaction zones having a tapered interior, each zone comprising at least one gas feed inlet pipe for introducing reaction gas mixtures, a central perforated diffuser pipe, a solid and liquid organic feed material inlet at the upper end of the uppermost zone, a solid and gas discharge outlet at the lower end of the bottom zone, said reactor vessel defining a sequence of reaction zones from the material inlet to the material outlet including drying, pyrolysis, combustion and gasification zones, and confining downwardly moving column of said feed materials within the said zones, a synthesis gas discharge pipe below the zones, and a heat exchanger below the zones.

2. The apparatus according to claim 1, wherein the solid and liquid organic feed are introduced by means of enclosed conveyor into the material inlet.

3. The apparatus according to claim 2, wherein a transition piece between the solids and liquid conveyor comprises of an inverted funnel shaped connector.

4. The apparatus according to claim 1, wherein the gas feed for introducing reaction gas into the zones comprises an oxygen-bearing stream and waste gas stream and a minimum of four distinct annuli communicating with atmosphere.

5. The apparatus according to claim 4, the gas feed admitting reaction gas is tangential to the surface of the reactor vessel.

6. The apparatus according to claim 5, wherein the number of tangential openings communicating between the annulus and the reactor vessel varies between 1 and 4.

7. The apparatus according to claim 4, wherein the opening for admitting oxygen-bearing gas into the respective zone traverses across the zone in which it is heated.

8. The apparatus according to claim 4, wherein the reaction gas comprises a mixture of air, oxygen, nitrogen, water or steam, and carbon dioxide.

9. The apparatus according to claim 8, wherein the concentration of oxygen is zero in the reaction gas which is a mixture of waste gas and oxygen-bearing gas.

10. The apparatus according to claim 8, wherein the waste gas is admitted through alternating zones within the reactor vessel.

11. The apparatus according to claim 1, wherein the inside of the reactor vessel is tapered into inverted funnel shape having a minimum inclusive diversion angle of 30 degrees.

12. The apparatus according to claim 1, wherein the reaction zones and solid residue discharge are separated by a porous grate.

13. The apparatus as defined in claim 1, wherein the diffuser pipe is blocked off at its terminal end within the upper zone of the reactor vessel and in which means of gas discharge is provided by gas nozzles along as well as the top of the diffuser pipe.

14. The apparatus according to claim 13 wherein there are no gas nozzles beyond the bottom reaction zone of the said reactor vessel.

15. The apparatus according to claim 1, wherein the synthesis gas discharge pipe is in communication with the reactor vessel.

16. The apparatus according to claim 1, wherein a system of material feeding device into the materials inlet of the reactor vessel comprises an enclosed feed conveyor connected to an enclosed feed storage silo to effectively seal off the reactor vessel from atmosphere to continuously feed the downwardly moving materials within the reactor vessel through an inverted cone shaped transition nozzle.

17. The apparatus according to claim 16, wherein the inverted transition nozzle comprises a minimum inclusive diversion angle of 30 degrees.

18. The apparatus according to claim 1, wherein the heat exchanger is air, water or oil.

19. The method of gasifying of solid, liquid and gaseous organic feed materials having a fuel value into synthesis gas, comprising:
   providing a gasification reactor vessel having a tapered interior with a minimum of four zones, each zone comprising at least one gas feed inlet pipe for introducing reaction gas mixtures, a central perforated diffuser pipe, a solid and liquid organic feed material inlet at the upper end of the uppermost zone, and a solid and gas discharge outlet at the lower end of the bottom zone, and
   defining a sequence of reaction zones from the material inlet to the material outlet including drying, pyrolysis, combustion and gasification zones.

20. The method of claim 19, wherein said the temperature of said reaction gas mixtures are controlled within each said zone.

21. The method of claim 19, wherein the inside of the reactor vessel is tapered into inverted funnel shape having a minimum inclusive diversion angle of 30 degrees.

22. The apparatus according to claim 1, wherein the cross sectional area of said tapered interior increases in the direction of material flow from the drying zone through the gasification zone.

23. The apparatus according to claim 1, wherein said tapered interior has an inverted funnel shape.

24. The apparatus according to claim 1, wherein said central perforated diffuser pipe has a closed end.

25. The apparatus according to claim 1, wherein said central perforated diffuser pipe is perforated along the reaction zones.

26. The apparatus according to claim 1, wherein gas flows through said central perforated diffuser pipe in an upward direction.

27. The apparatus according to claim 1, wherein said central perforated diffuser pipe introduces inert gas into said reaction zones.

* * * * *